G. L. JONTZ.
FLY TRAP.
APPLICATION FILED JUNE 7, 1913.
1,094,336.
Patented Apr. 21, 1914.
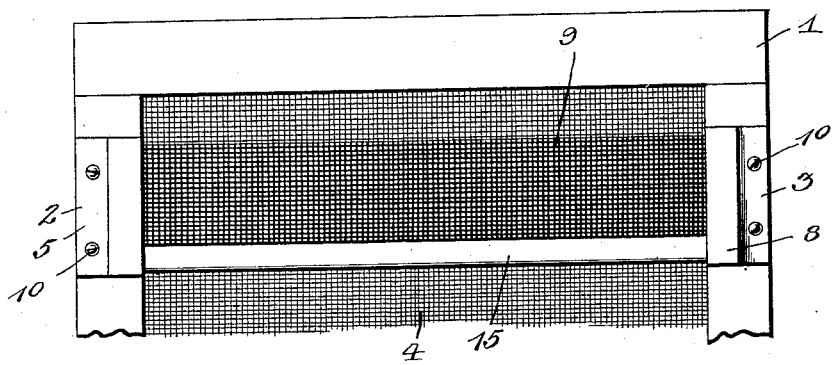
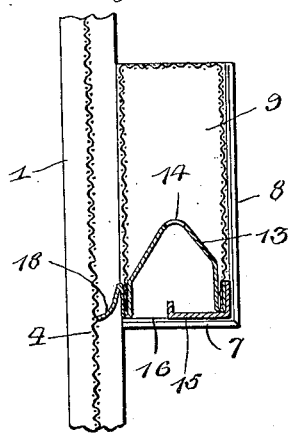
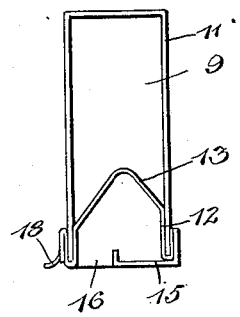
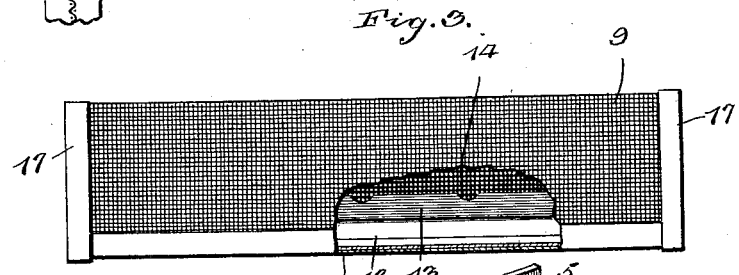
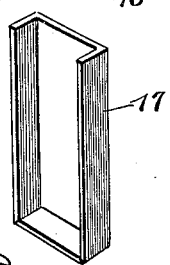
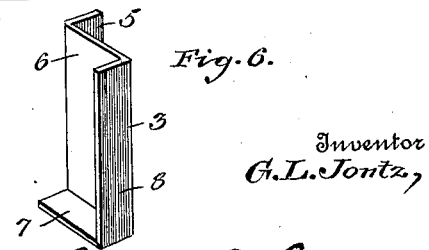

UNITED STATES PATENT OFFICE.

GEORGE LOUIS JONTZ, OF JENERA, OHIO.

FLY-TRAP.

1,094,336.　　　Specification of Letters Patent.　　Patented Apr. 21, 1914.

Application filed June 7, 1913. Serial No. 772,395.

*To all whom it may concern:*

Be it known that I, GEORGE LOUIS JONTZ, a citizen of the United States, residing at Jenera, in the county of Hancock and State of Ohio, have invented new and useful Improvements in Fly-Traps, of which the following is a specification.

This invention relates to a fly trap which is adapted to be mounted upon a screen door or window for catching the flies which may alight thereon, the primary object being to provide a device of this character which is adapted to extend over the entire width of the screen so that flies, which invariably crawl upwardly upon such a surface, may have free access to the entrance opening in the trap body which extends throughout the entire length of the latter.

A further object of the invention is to provide a fly trap of the class set forth which may be conveniently mounted within supporting brackets provided on the door or window frame, and which is in the form of an elongated body constructed in the form of a cage and has closure caps for its ends, which latter are removable, so that the trap may be removed readily from the supporting brackets and opened for the purpose of emptying its contents and cleaning the same by running water therethrough or in any other suitable manner.

A still further object is to provide a device of the class described which is of simple construction and is comprised of few parts so as to be easy to operate and inexpensive in manufacture.

The invention consists in the features of construction, combination, and arrangement of parts, hereinafter fully described and claimed, reference being had to the accompanying drawing, in which:

Figure 1 is a front elevation of the device in use upon a screen door; Fig. 2 is a vertical sectional view taken through the same; Fig. 3 is a front elevation of the trap body, part of which is broken away; Fig. 4 is an end elevation of the same, the closure cap being removed; Fig. 5 is a detail perspective view of one of the closure caps for the trap body; and, Fig. 6 is a similar view of one of the supporting brackets.

In the drawing, the numeral 1 designates the frame of a screen door to which the supporting brackets 2 and 3 for the trap are secured, at either side of the door screen 4 and adjacent to the upper end thereof. Each of said brackets is constructed from sheet metal of any suitable kind such as heavy tin or iron, and is in the form of an angular body including an attaching portion 5 and an outwardly extending portion 6 disposed at right angles to the portion 5 and provided with inbent bottom and front flanges 7 and 8 which coöperate with the front face of the door frame to provide a socket for the adjacent end of the trap body 9. The attaching portion 5 of each bracket is secured to the door frame by means of the screws 10 or in any other suitable manner.

The trap body 9 is formed preferably of wire mesh and is substantially U-shaped in cross section, its terminal edges being reinforced by the U-shaped securing strips 11 which are formed from sheet metal. A sheet metal trapping member 12 is secured to the longitudinal edges of the body 9 and includes an inwardly projecting, V-shaped portion 13 which is provided in its ridge with a plurality of relatively spaced openings 14 which are barely large enough to permit the passage of flies therethrough into the foraminous body of the trap. A bait supporting flange 15 projects inwardly from the outer edge of the member 12 to such an extent as to afford a narrow slot or mouth 16 through which flies may gain entrance to the trap. A rectangular cap 17 is adapted to be fitted onto each end of the trap body and to be secured in applied position by the corresponding supporting brackets carried by the door frame, when the trap body is mounted within the said brackets.

The trap body is mounted within the supporting brackets 2 and 3 so that the trapping member is disposed lowermost with its mouth 16 adjacent to the screen 4, an angularly bent flange 18 being provided on the inner edge of the said member for engagement with the door screen so that flies crawling upwardly along the adjacent surface of the screen will not be permitted to pass between the trap body and the screen, but must necessarily crawl into the trapping member through its mouth. The flies will be attracted also by the presence of bait within the trapping member, such as molasses or other sticky liquid which may be spread upon the inner face of the flange 15. After the flies have entered the trapping member they may pass upwardly through the apertures 14 into the interior of the trap body, from which escape will be practically impossible.

When it is desired to empty the trap body and clean the same, the said body may be removed from the supporting bracket by upward sliding movement and may be subjected to a stream of hot water so that the flies within the same may be scalded. Then, the end caps may be removed so as to permit the dead flies to be removed in any suitable manner. After the body has been cleaned by washing, the caps may be applied to the ends thereof and the device as a whole may be again positioned within the supporting brackets for further use.

From the foregoing description taken in connection with the accompanying drawings it should be apparent that I have provided a neat and simply constructed fly trap which may be operated conveniently and will be effective in its use. It is to be understood, however, that any changes in the details of construction which fall within the scope of the invention may be resorted to as found necessary in practice.

Having thus described my invention, what I claim is:

The combination with a support, of a pair of companion supporting brackets mounted upon said support in spaced relation to each other and forming opposed sockets, an elongated trap body adapted to be positioned with its ends within the said sockets, the said body having open ends, and closure caps adapted to be fitted onto the said ends for reception within the sockets afforded by the supporting brackets.

In testimony whereof I affix my signature in presence of two witnesses.

GEORGE LOUIS JONTZ.

Witnesses:
JOHN L. HIGBIE,
MARY E. HIGBIE.

---

Copies of this patent may be obtained for five cents each, by addressing the "Commissioner of Patents, Washington, D. C."